(12) United States Patent
Uli

(10) Patent No.: US 6,443,313 B1
(45) Date of Patent: Sep. 3, 2002

(54) COOKING OIL OR GREASE SEPARATOR

(76) Inventor: Ross Uli, 18205 Pine Ave., Fontana, CA (US) 92335

( * ) Notice: Subject to any disclaimer, the term of this patent is extended or adjusted under 35 U.S.C. 154(b) by 0 days.

(21) Appl. No.: 09/545,222

(22) Filed: Apr. 7, 2000

(51) Int. Cl.[7] .............................................. B01D 29/085
(52) U.S. Cl. ...................... 210/470; 210/465; 210/471; 210/476; 210/483; 210/495; 99/322; 99/323; 99/495; 99/496; D7/667
(58) Field of Search ................................. 210/470–471, 210/473, 476, 483, 495, 464–465, 335, 315; 30/324–325, 326; 99/322–323, 495–496, 508; D7/667, 369, 691–692

(56) References Cited

U.S. PATENT DOCUMENTS

| | | | | |
|---|---|---|---|---|
| 118,140 A | * | 8/1871 | Loeb | |
| 559,905 A | * | 5/1896 | Pike | |
| 858,291 A | * | 6/1907 | Irby | |
| 1,175,282 A | * | 3/1916 | Maine | |
| 1,421,622 A | * | 7/1922 | Van Ness | |
| 1,654,980 A | * | 1/1928 | Le Duc | |
| 1,703,266 A | * | 2/1929 | Dowling | |
| 2,575,768 A | * | 11/1951 | Pearsall | |
| D210,399 S | * | 3/1968 | Wichmann | |
| 3,392,845 A | * | 7/1968 | Shapiro et al. | |
| 4,040,185 A | * | 8/1977 | Jacobi | |
| 4,149,575 A | * | 4/1979 | Fisher | |
| 4,942,811 A | * | 7/1990 | Kuhn | |
| 5,005,294 A | * | 4/1991 | Roberts et al. | |
| 5,077,990 A | * | 1/1992 | Jamentz | |
| 5,084,177 A | * | 1/1992 | Keene | 210/470 |
| 5,199,349 A | * | 4/1993 | Hansen | |
| 5,510,028 A | * | 4/1996 | Kuhlman | 210/307 |
| 5,526,737 A | * | 6/1996 | Betzen | 99/495 |
| 5,560,109 A | * | 10/1996 | Lam | |
| D380,354 S | * | 7/1997 | Ferrin | |

* cited by examiner

Primary Examiner—Matthew O. Savage
Assistant Examiner—Marianne Ocampo
(74) Attorney, Agent, or Firm—John D. Gugliotta

(57) ABSTRACT

The invention is a kitchen utensil that aids in the removal of grease or oil from soups, sauces, etc. Specifically, the device is a ladle with an inverted funnel that when dipped into soup or sauce, it effectively removes the fat from the top of the soup or sauce. The invention works on the notion that oil and water do not mix, and as a result, the oil will float on the top of the water. When dipped into the soup, the fat is forced through the inverted funnel until it is forced out and then falls into the ladle device.

2 Claims, 5 Drawing Sheets

COOKING OIL OR GREASE SEPARATOR

RELATED APPLICATIONS

There are no previously filed, nor currently any co-pending applications, anywhere in the world.

BACKGROUND OF THE INVENTION

1. Field of the Invention

The present invention relates generally to food preparation devices and, more particularly, to a ladle for separating oil and grease from soups and liquids and the like.

2. Description of the Related Art

Cooks, chefs and others who prepare meals are familiar with the hassles associated with the separation of grease, oil, or fat from soups or sauces while they are being cooked. More and more people are becoming aware of the health risks associated with the over consumption of such substances, and wish to remove as much as possible from their diet. Quite often, this is done by the gentle tipping of the pot or pan to allow the undesired liquid to drain off. Other options include the use of cup separators, or syringes, of neither which are very efficient nor easy to use. Additionally, the use of such devices, requires that they be cleaned afterwards, thus increasing the cleanup chores. Accordingly, the need has developed for a means by which to remove oils, greases, fats and other similar undesired liquids from soups and sauces while being cooked. The development of the Cooking Oil or Grease Separator fulfills this need.

In the related art, grease and water separators used in cooking are well known. There exists many utility and design patents for soup or sauce skimming ladles which remove the grease and fast from the surface of the liquid. Most of these designs take advantage of the physical properties of grease and oil in that grease and oil do not mix and that the grease will float on the surface of the water. Typically, the device is inserted into the vessel containing the liquids and a portion of the liquid is forced through an opening in the bottom of the device. Since the grease or oil is on top it is forced through first and allowed to accumulate in a chamber in the device. Once water or non-fat liquid begins to come through the opening the process is stopped. There also exists devices which mop up the grease or oil with an absorbent material much like a mop absorbs water off of the floor.

The present invention is of the first variety of grease separators described comprised of a multi-piece snap together ladle designed to be inserted into a soup or sauce and collect grease in a chamber in the bottom of the label. Only one patent in the prior art describes a similar device. U.S. Pat. No. 5,526,737 issued to Betzen describes ladle type skimmer consisting of a ladle with a truncated cone shape funnel located in the body of the ladle and a screen mesh that snaps into the bottom of the body. The present invention is an improvement on this type ladle skimmer by enlarging the ladle basin and improving the shape of the truncated cone portion for improved separating capabilities and increasing the volume of the cavity where fat and oil may collect. In addition, a large downwardly tapered funnel suction is added to the bottom of the ladle base with a screen section sandwiched therebetween for improved drawing capability of fluids from the soup or sauce vessel to the ladle.

A search of the prior art did not disclose any patents that read directly on the claims of the instant invention; however, the following references were considered related:

| U.S. Pat. No. | Inventor | Issue Date |
|---|---|---|
| 5,526,737 | Betzen | Jun. 18, 1996 |
| 5,199,349 | Hansen | April 6, 1993 |
| 5,084,177 | Keene | Jan. 28, 1992 |
| 5,077,900 | Jamentz | Jan. 7, 1992 |
| 5,005,294 | Roberts et al. | Apr. 9, 1991 |
| 4,942,811 | Kuhn | Jul. 24, 1990 |
| D 380,354 | Ferrin | Jul. 1, 1997 |
| 4,040,185 | Jacobi | Aug. 9, 1977 |
| 1,654,980 | Le Duc | Oct. 20, 1926 |

SUMMARY OF THE INVENTION

It is therefore an object of the present invention to provide an improved cooking oil or grease separator.

It is an object of the present invention to provide for the efficient and quick removal of oils, greases.

It is another object of the present invention to work in soups, sauces, etc.

It is yet another object of the present invention to be easy to use.

It is a benefit of the present invention to provide for healthier food.

It is another benefit of the present invention to also function as a conventional ladle.

It is an advantage of the present invention that it reduces utensil cleanup.

It is another advantage of the present invention that it can be made in a large scale version to aid in oil spill cleanups.

Briefly described according to one embodiment of the present invention, the Cooking Oil or Grease Separator is a device that allows oils, greases, fats and other undesired liquids from soups and sauces while being cooked in an efficient and safe manner. The device consists of a ladle with an inverted funnel section located in the interior of the ladle. As it is lowered into soups or sauces, the oil, fat or other similar lighter than water liquids are forced through the funnel and into the ladle portion. From there, they can simply be disposed of in a conventional manner. Additionally, the ladle may serve the function of stirring or serving of the food, thus reducing the amount of utensils that must be cleaned after food preparation duties.

It is also envisioned that a large scale industrial version may aid in the environmental cleanup of oil spills. The Cooking Oil or Grease Separator would be manufactured from plastic and/ or stainless steel.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

| | |
|---|---|
| 20 | Ladle |
| 20A | Body |
| 20B | Handle |
| 20C | Aperture |
| 20D | Throat |
| 20E | Cavity |
| 20F | Separator Structure |
| 20G | Grease Collection Cavity |
| 30A | Upper Surface |
| 30B | Lower Surface |
| 30C | Ring |
| 40 | Funnel |
| 40A | Funnel Aperture |
| 40B | Funnel Sidewalls |
| 40C | Funnel Throat |
| 40D | Locking Slot |

DESCRIPTION OF THE PREFERRED EMBODIMENTS

The best mode for carrying out the invention is presented in terms of its preferred embodiment, herein depicted within the Figure.

1. Detailed Description of the FIGS.

Figure 1:
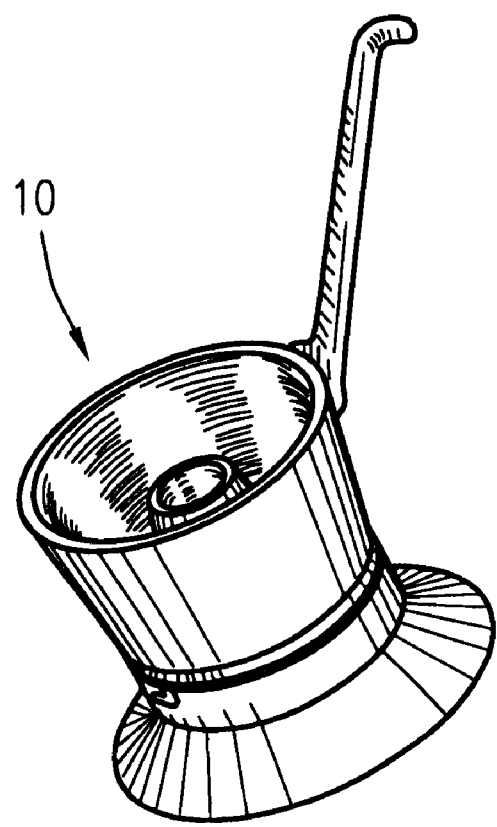
FIG. 1 is a perspective view of a grease and water separator, according to the preferred embodiment of the present invention.

Referring now to FIG. 1, a grease and oil/water separator 10 is shown, according to the present invention, for separating grease and oil from sauces, soups, and other recipes.

Figure 2:
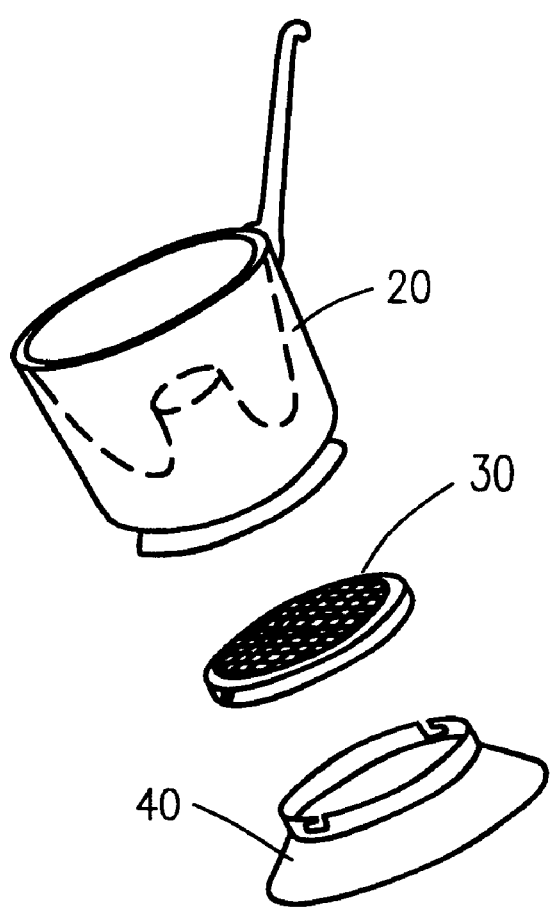
FIG. 2 is an exploded perspective view of a grease and water separator, according to the preferred embodiment of the present invention.

Referring to FIG. 2, an exploded perspective view of a grease and oil/water separator 10 is shown comprised of a ladle 20, screen 30, and funnel 40. Screen 30 is an annular shaped mesh designed to fit in a specially formed cavity between ladle 20 and funnel 40. Screen 30-is designed to keep solids from the soup or sauce received through funnel 40 from entering into ladle 20 and possible blocking fluid communication from funnel 40.

Figure 3:
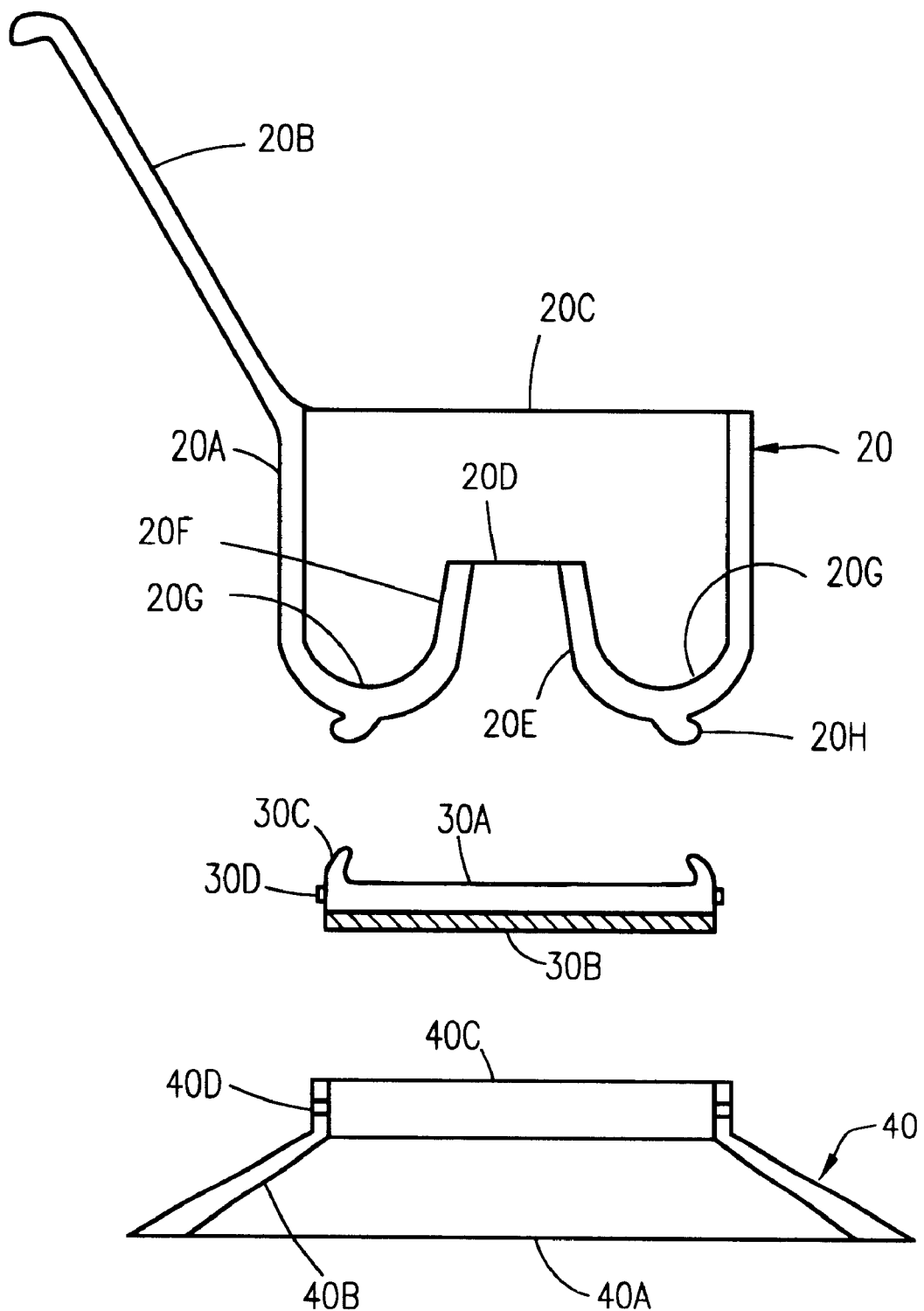
FIG. 3 is a side view of a grease and water separator, according to the preferred embodiment of the present invention.

FIG. 3 shows an exploded cross sectional side view of a grease and oil/water separator 10 showing the detail of screen 30 sandwiched between ladle 20 and funnel 40. Funnel 40 has a wide aperture 40A for receiving and collecting fluids from within the cooking vessel below. A throat 40C allows fluid communication of the fluids entering funnel 40 with screen 30, cavity 20E, and ultimately throat 20D and cavity 20G of ladle 20. Funnel 40 has inwardly tapered sidewalls 40B for channeling fluids to throat 40C via fluid pressure created by the user pushing funnel 40 into the soup or sauce. Ladle 20 and funnel 40 are removably attached together via a slot arrangement 40D located on the funnel throat 40C designed to receive screen locking tabs 30D and a ring 30C located on the upper surface 30A of the screen 30 which receive a projecting flange 20H located on the bottom of ladle body 20A.

Key to the functionality of the device is a separator structure 20F formed in the bottom of ladle body 20A. Separator structure 20F is a semi cylindrical/truncated cone shape that forms a hollow cavity 20E on one side and forms the sidewalls for an annular cavity 20G that serves as a receptacle for the collection of fatty fluids and oils. Cavity 20E opens into the inner volume of ladle 20 through a throat 20D. It is here that fluids enter ladle 20 and fall into cavity 20G.

Figure 4:
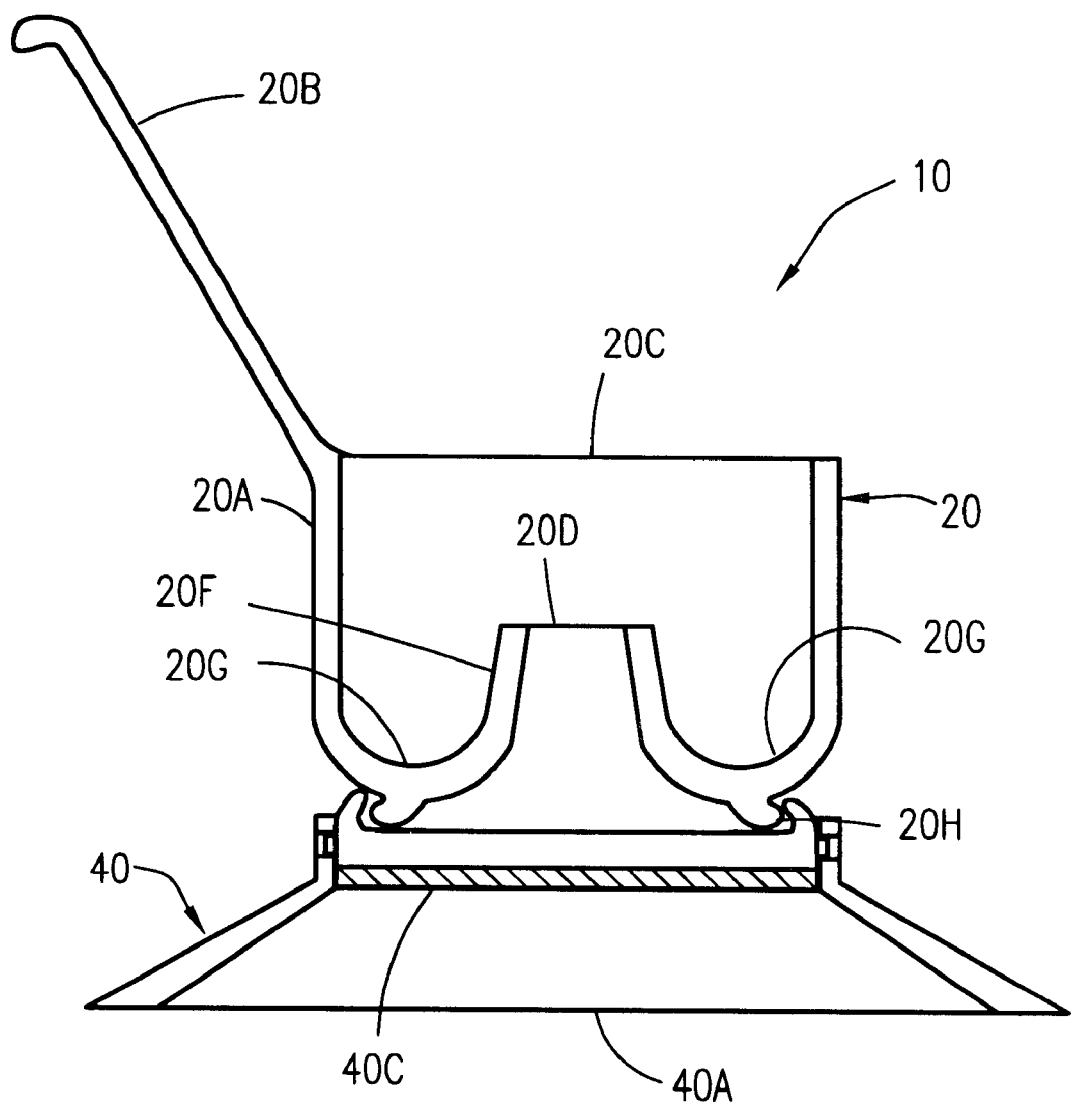
FIG. 4 is an exploded side view of a grease and water separator, according to the preferred embodiment of the present invention.

Referring now to FIG. 4, an cross sectional side view of an assembled grease and oil/water separator 10 is shown. Screen 30 is inserted between cavity 20E of ladle 20 and throat 40C of funnel 40.

Figure 5:
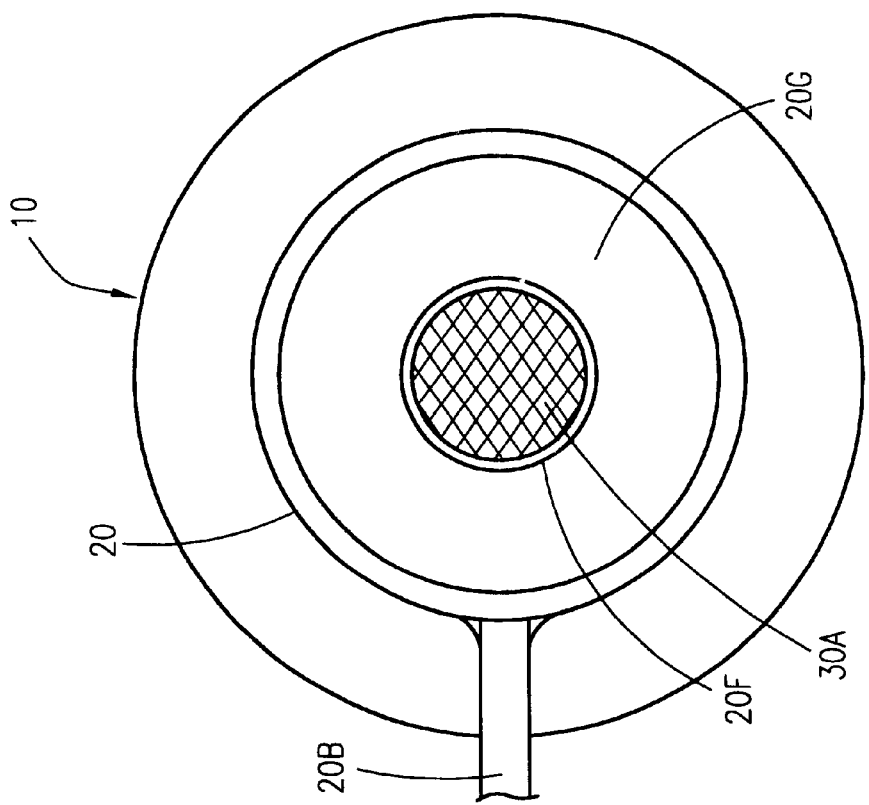
FIG. 5 is a top view of a grease and water separator, according to the preferred embodiment of the present invention.

Referring now to FIG. 5, a top view of an assembled grease and oil/water separator 10 is shown. Seen in more detail is the upper surface 30A of screen 30 and cavity 20G for collecting fatty fluids and oils.

Figure 6:
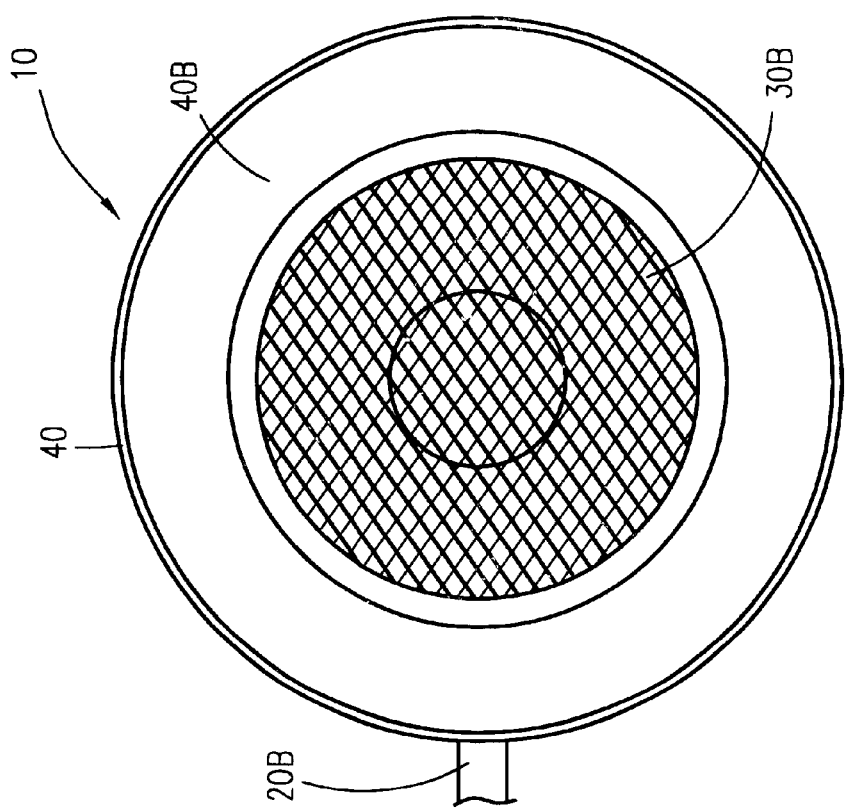
FIG. 6 is a bottom view of a grease and water separator, according to the preferred embodiment of the present invention.

Referring now to FIG. 6, an cross sectional side view of an assembled grease and oil/water separator 10 is shown. Seen in more detail is the lower surface 30B of screen 30 and the bottom of funnel 40 showing the inwardly tapering sidewalls 40B of funnel 40 for channeling fluids toward screen 30 and ultimately to ladle 20.

Figure 7:
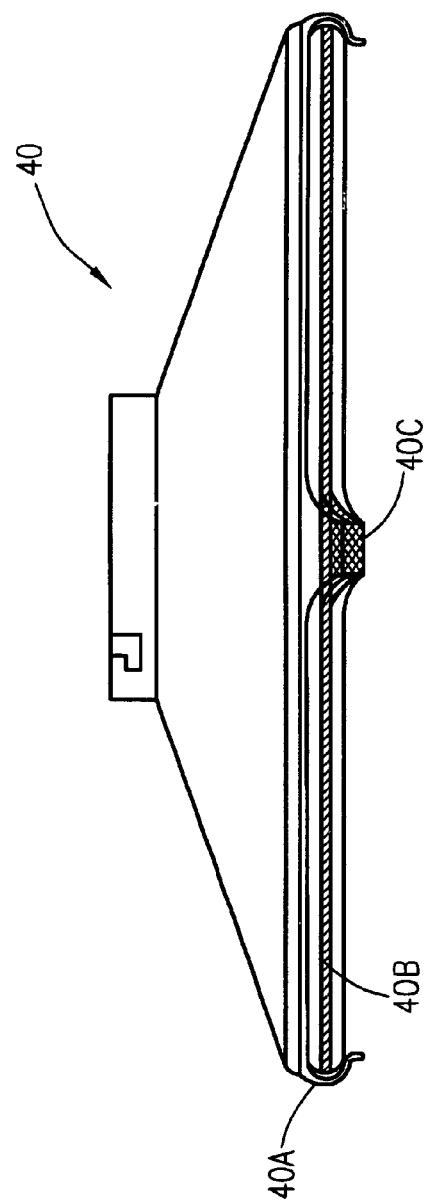
FIG. 7 is an enlarged side view of a funnel from a grease and water separator, according to the preferred embodiment of the present invention.
Figure 8:
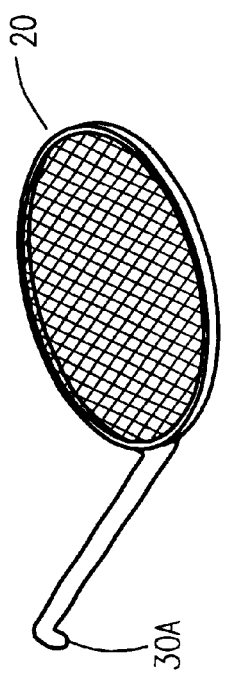
FIG. 8 is a perspective view of the filtering screen from a grease and water separator, according to the preferred embodiment of the present invention.

FIGS. 7 and 8 show alternate preferred embodiments of funnel 40 which may be enlarged for larger size cooking pots and containers and ladle 20 which may incorporate a handle 30A for ease of handling. In yet another alternate preferred embodiment, the same concept may be used in an enlarged scale for application for separating oil and grease from water where necessary in industry or emergency oil spills.

2. Operation of the Preferred Embodiment

To use the present invention, one first assembles it by inserting the screen between the ladle section and funnel. Special interlocking slots and tabs lock the ladle section and funnel together. The device is then pressed onto the surface of the soup or sauce. The funnel section forces the grease or oil, which is on the surface of the soup or sauce, into the ladle through the screen. The screen blocks any solids that may enter through the funnel Section. Once the grease or oil has been skimmed from the surface the soup or sauce will now start to enter the ladle at which point the user will discontinue pressing the device into the soup or sauce.

The foregoing description is included to illustrate the operation of the preferred embodiment and is not meant to limit the scope of the invention. The scope of the invention is to be limited only by the following claims.

What is claimed is:

1. A grease or oil and water separator comprising:

a ladle having a semi cylindrical/truncated cone shape that forms a hollow cavity on one side and forms sidewalls for an annular cavity that serves as a receptacle for the collection of fatty fluids and oils, said hollow cavity opening into the inner volume of said ladle through a funnel throat;

a funnel adapted affixed within said hollow cavity within said semi cylindrical/truncated cone shape of said ladle, said funnel in fluid communication with said ladle and forming a cavity between said funnel and said ladle wherein said funnel having a wide aperture below said ladle for receiving and collecting fluids form within a cooking vessel below; and said funnel throat having inwardly tapered sidewalls for channeling fluids through said funnel throat via fluid pressure created by a user pushing said funnel into fluids within said cooking vessel; and a screen entirely traversing said funnel throat and forming an annular shaped mesh designed to fit in a formed cavity between said ladle and said funnel, said screen for keeping solids from traveling through said funnel and entering into said ladle.

2. The grease or oil and water separator of claim 1, wherein said ladle and said funnel are removably attached together via a slot arrangement located on said funnel throat designed to receive screen locking tabs and a ring located on an upper surface of said screen which receive a projecting flange located on a bottom of said ladle.

* * * * *